(12) United States Patent
Rathakrishnan et al.

(10) Patent No.: US 7,437,371 B2
(45) Date of Patent: Oct. 14, 2008

(54) SYSTEMS AND METHODS FOR THE IMPLEMENTATION OF UNORDERED AND ORDERED COLLECTIONS IN A DATA STORE

(75) Inventors: Balaji Rathakrishnan, Sammamish, WA (US); Beysim Sezgin, Redmond, WA (US); Denis Y. Altudov, Redmond, WA (US); Jose A. Blakeley, Redmond, WA (US); Oliver Nicholas Seeliger, Sammamish, WA (US); Ramachandran Venkatesh, Bellevue, WA (US); Wei Yu, Issaquah, WA (US); Dragan Tomic, Redmond, WA (US); Denis Churin, Bellevue, WA (US); Bruno H. M. Denuit, Bellevue, WA (US); Conor J. Cunningham, Redmond, WA (US); Stefano Stefani, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 147 days.

(21) Appl. No.: 11/027,416

(22) Filed: Dec. 30, 2004

(65) Prior Publication Data

US 2005/0177551 A1 Aug. 11, 2005

Related U.S. Application Data

(63) Continuation-in-part of application No. 10/837,929, filed on May 3, 2004, which is a continuation-in-part of application No. 10/775,282, filed on Feb. 10, 2004, now Pat. No. 6,976,029.

(60) Provisional application No. 60/566,740, filed on Apr. 30, 2004.

(51) Int. Cl.
*G06F 17/00* (2006.01)

(52) U.S. Cl. .......................... 707/100; 707/4; 707/200; 717/108

(58) Field of Classification Search ............... 707/1–10, 707/100–104.1, 200–206; 717/104, 108, 717/165
See application file for complete search history.

(56) References Cited

U.S. PATENT DOCUMENTS 5,761,493 A * 6/1998 Blakeley et al. ................ 707/4

(Continued)

FOREIGN PATENT DOCUMENTS

WO WO 02/075539 A2 9/2002

OTHER PUBLICATIONS

Michael Jaedicke et al., On parallel Processing of Aggregate & Scalar Functions in Object-relational DBMS, ACM, 1999, 379-389.*

(Continued)

*Primary Examiner*—Jean B Fleurantin
(74) *Attorney, Agent, or Firm*—Woodcock Washburn LLP

(57) ABSTRACT

Several embodiments of the present invention are directed to systems and methods for extending the UDT framework of an extended relational data store (ERDS) to include support for unordered collections (multisets) and ordered collection (lists). More specifically, several embodiments of the present invention use an UDT infrastructure, CLR generics, and a new UNNEST operator to create and utilize a special type abstraction for collections that is simultaneously a scalar and a relation. As a scalar, this collection type can be processed by all parts of the data store engine that understand scalars (including but not limited to the client stack) and, as a relation, this collection type is queriable like any other type of relation.

16 Claims, 4 Drawing Sheets

U.S. PATENT DOCUMENTS

| | | | | |
|---|---|---|---|---|
| 5,826,077 | A | * | 10/1998 | Blakeley et al. ............... 707/4 |
| 5,893,106 | A | | 4/1999 | Brobst et al. ................ 707/102 |
| 5,900,870 | A | | 5/1999 | Malone et al. .............. 345/333 |
| 6,006,214 | A | * | 12/1999 | Carey et al. ..................... 707/2 |
| 6,016,497 | A | * | 1/2000 | Suver ...................... 707/103 R |
| 6,047,291 | A | | 4/2000 | Anderson et al. ........... 707/103 |
| 6,085,192 | A | | 7/2000 | Mendez et al. ................ 707/10 |
| 6,108,004 | A | | 8/2000 | Medl ......................... 345/346 |
| 6,112,024 | A | | 8/2000 | Almond et al. ............. 395/703 |
| 6,151,606 | A | | 11/2000 | Mendez ...................... 707/201 |
| 6,199,195 | B1 | | 3/2001 | Goodwin et al. ............... 717/1 |
| 6,338,056 | B1 | | 1/2002 | Dessloch et al. .............. 707/2 |
| 6,370,541 | B1 | | 4/2002 | Chou et al. ................. 707/103 |
| 6,519,597 | B1 | | 2/2003 | Cheng et al. .................. 707/10 |
| 6,556,983 | B1 | | 4/2003 | Altschuler et al. ............ 706/55 |
| 6,578,046 | B2 | | 6/2003 | Chang et al. ................ 707/103 |
| 6,708,221 | B1 | | 3/2004 | Mendez et al. ............. 709/248 |
| 2002/0091702 | A1 | | 7/2002 | Mullins ....................... 707/100 |
| 2002/0198891 | A1 | | 12/2002 | Li et al. ....................... 707/102 |

OTHER PUBLICATIONS

Thodoros Topaloglou, storage management for knowledge bases, 1993, ACM, 95-104.*

Francois Bancilhon, object databases, Mar. 1996, ACM, vol. 28, 137-140.*

Praveen Seshadri, enhanced abstract data types in object-relational databases, Aug. 1998, ACM, vol. 7, 130-140.*

Andrews, T. et al., "Combining Language and Database Advances in an Object-Oriented Development Environment", *OOPSLA Proceedings*, Oct. 4-8, 1987, 430-440.

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen, (ed)*; North Holland Publishing Company: 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors-For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series*, vol. 3, *Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented as the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp- An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Usign Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002, 14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2), 108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2), 403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25), 117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Mazzola Paluska, J. et al., "Footloose: A Case for Physical Eventual Consistency and Selective Conflict Resolution", *Proceedings of the $5^{th}$ IEEE Workshop on Mobile Computing Systems and Applications*, 2003, 170-179.

Huang, Yun-Wu. Et al., "Lightweight Version Vectors for Pervasive Computing Devices", *IEEE*, 2000, 43-48.

Ramsey, N. et al., "An Algebraic Approach to File Synchronization", *Software Engineering Notes, Association for Computing Machinery*, Sep. 2001, 26(5), 175-185, XP002295139.

Gray, J. et al., "The Dangers of replication and a Solution", *SIGMOD*, 1996, 25(2), 173-182, XP-002146555.

Helal, S. et al., "A Three-tier Architecture for Ubiquitous Data Access", *Computer Systems and Applications ACS/IEEE*, Jun. 2001, 177-180, XP010551207.

Kistler, J.J. et al., "Disconnected Operation in the Coda File System", *ACM Transactions on Computer Systems*, Feb. 1992, 10(1), 3-25, XP000323223.

Kistler, J.J. et al., "Increasing File System Availability through Second-Class Replication", *IEEE*, 1990, 65-69, XP010021244.

"SyncML Sync Protocol", 2000, Version 1.0, 60 pages, http://www.syncml.org/docs/syncml_protocol_v10_20001207.pdf.

Seshadri, P. et al., "SQLServer for Windows Ce-a Database Engine for Mobile and Embedded Platforms", *Data Engineering, Proceedings of the $16^{th}$ International Conference, IEEE Computer Society*, Mar. 2000, 642-644, XP 010378761.

Berenson, H. "A Critique of ANSI SQL Isolation Levels", *SIGMOD Record*, 1995, 24(2), 10 pages.

Greenwald, R. et al., "Oracle Essentials: Oracle 8 & Oracle 8i", *MultiUser Concurrency*, 1999, Ch. 7, 7 pages, XP-002312028.

Plattner, C. et al., "Ganymed: Scalable Replication for Transactional Web Applications", *IFIP International federation for Information Processing*, 2004, 155-174, XP-002370197.

Shapiro, M. et al., "Managing Databases with Binary Large Objects", *IEEE*, 1999, 185-193, XP-000922048.

\* cited by examiner

402 Query made against collection detected by data store engine → 404 Data store recognizes the collection type → 406 Data store unnests the collection into a queriable object → 408 Query directed to queriable object 302 Define generic type: *Collection<T>* → 304 Define concrete type: *Collection<Address>* → 306 Instantiate collection as property of an Entity

SYSTEMS AND METHODS FOR THE IMPLEMENTATION OF UNORDERED AND ORDERED COLLECTIONS IN A DATA STORE

CROSS-REFERENCE TO RELATED APPLICATIONS

This application claims benefit of U.S. Provisional Application No. 60/566,740, filed Apr. 30, 2004, entitled "SYSTEMS AND METHODS FOR THE IMPLEMENTATION OF MULTISETS IN A DATABASE SYSTEM," the entire contents of which are hereby incorporated herein by reference. In addition, this application is also a continuation-in-part of U.S. patent application Ser. No. 10/837,929, filed on May 3, 2004, entitled "SYSTEMS AND METHODS FOR SUPPORTING INHERITANCE FOR USER-DEFINED TYPES," which is a continuation-in-part of U.S. patent application Ser. No. 10/775,282, filed on Feb. 10, 2004, entitled "SYSTEM AND METHOD FOR PROVIDING USER DEFINED TYPES IN A DATABASE SYSTEM," the contents of which are hereby incorporated herein by reference.

This application is related by subject matter to the inventions disclosed in the following commonly assigned applications, the contents of which are hereby incorporated into this present application in their entirety: U.S. patent application Ser. No. 10/821,687, filed on Apr. 9, 2004, entitled "SYSTEMS AND METHODS FOR FRAGMENT-BASED SERIALIZATION"; U.S. patent application Ser. No. 10/692,225, filed on Oct. 23, 2003, entitled "SYSTEM AND METHOD FOR OBJECT PERSISTENCE IN A DATABASE STORE"; and U.S. patent application Ser. No. 10/795,623, filed on Mar. 8, 2004, entitled "STRUCTURED INDEXES ON RESULTS OF FUNCTION APPLICATIONS OVER DATA."

FIELD OF THE INVENTION

The present invention relates to data storage in a computer system and to systems supporting user-defined types (UDTs) in a database system where UDTs are an extensibility mechanism employed in connection with relational database engines and file systems to extend a scalar type system(s) of a data store by registering managed types that implement a specific contract. More specifically, the present invention relates to implementation of multisets and ordered collections in a database system via UDTs that are both scalar and queriable.

BACKGROUND OF THE INVENTION

User-Defined Types

As known and appreciated by those of skill in the art, MICROSOFT SQL SERVER is a comprehensive database management platform that provides extensive management and development tools, an extraction-transformation-loading (ETL) tool, business intelligence and analysis services, and other capabilities. In addition, the MICROSOFT WINDOWS .NET Framework Common Language Runtime (CLR) was recently integrated into the SQL SERVER database.

The CLR is the heart of the MICROSOFT .NET Framework, and provides the execution environment for all .NET code. Code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a .NET routine.

In previous versions of SQL SERVER, database programmers were limited to using Transact-SQL when writing code on the server side. Transact-SQL is an extension of the Structured Query Language ("SQL") as defined by the International Standards Organization (ISO) and the American National Standards Institute (ANSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at structural data access and management, it is not a full-fledged programming language as are VISUAL BASIC .NET and C#. For example, Transact-SQL does not support arrays, collections, for-each loops, bit shifting, or classes.

With the CLR integrated into the SQL SERVER database, database developers have been able to perform tasks that were impossible or difficult to achieve with Transact-SQL alone. Both VISUAL BASIC .NET and C# are modem programming languages offering full support for arrays, structured exception handling, and collections. Developers can leverage CLR integration to write code that has more complex logic and is more suited for computation tasks using languages such as VISUAL BASIC .NET and C#. These programming languages offer object-oriented capabilities such as encapsulation, inheritance and polymorphism. Related code can be easily organized into classes and namespaces.

Managed code is better suited than Transact-SQL for number crunching and complicated execution logic, and features extensive support for many complex tasks, including string handling and regular expressions. With the functionality found in the .NET Framework Base Class Library (BCL), database developers have access to thousands of pre-built classes and routines which can be easily accessed from any stored procedure, trigger or user-defined function.

Another benefit of managed code is type safety. Before managed code is executed, the CLR verifies that the code is safe. This process is known as "verification." During verification, the CLR performs several checks to ensure that the code is safe to run. For example, the code is checked to ensure that no memory is read that has not be been written to. The CLR will also prevent buffer overflows.

When writing managed code, the deployment unit is called an assembly. An assembly is packaged as a dynamic link library (DLL). Managed DLL assemblies can be loaded into and hosted by SQL SERVER. The CREATE ASSEMBLY statement is used to register an assembly in the server. Here is an example:

CREATE ASSEMBLY YukonCLR
FROM 'C:\MyDBApp\YukonCLR.dll'

In this example, the FROM clause specifies the pathname of the assembly to load.

SQL SERVER has traditionally supported "built-in" scalar types such as integer, floating point number, date, time, and character string. These built-in types also come with a set of built-in operations such as +, -, *, / as well as built-in functions over these types. These types, operations, and functions are "built-in" in the sense that they are implemented and packaged by the product and users cannot define their own types.

It is desirable for a database system, such as SQL SERVER, to allow users to extend the type system of the database system such that users could create new types that act as scalar types in the database system but which contain more complex structure and behavior such as to create a "Point" type consisting of X and Y coordinates, among other things. In this regard, the SQL standard and some database management system (DBMS) products have used the term "user-defined type" to describe several forms of type extensibility. For example, the SQL-99 standard describes a "distinct type," which is a type that can be defined by a user to have an internal representation that is a value of an existing SQL built-in data type. A distinct type may optionally share comparison and arithmetic operators, type conversions, and aggregate (column) functions (e.g., max, min, average) with an existing scalar type. The distinct type may allow constraints to be defined on its values. In addition, a distinct type may expose behaviors beyond those of an existing scalar type by defining new functions specific to the distinct type via user-defined functions. With respect to type checking, the distinct type and existing scalar types are considered to be different types.

An advantage of distinct types is ease of definition. If the internal representation of the new type has a single data member that can be described with an existing built-in type and the built-in type already implements most of the behaviors required on the new type, then distinct types are an attractive alternative. The user does not have to worry about implementing the behaviors required to manage the on-disk storage of the type, constructors, comparison operators (used for ordering and indexing), arithmetic operators, and type conversion (casting) operators. The user only needs to choose what functionality of the underlying built-in type needs to be exposed on the distinct type and optionally add constraints on values or additional functions on the new type. Another advantage of distinct types is that all of the query processing available for built-in types, such as computation of histograms, can be readily used on columns of distinct types. A disadvantage of distinct types, however, is that they can not easily be used to create more complex types.

The SQL-99 standard also described a "structured type," which is a type that can be defined by user and that has an internal representation that is a collection of data members, each of which may be of a different SQL built-in or user-defined type. This is similar to the notion of a struct in C and C++. SQL-99 describes a style for defining structured types by which a user only needs to define the type in terms of its internal structure. The system automatically generates accessor and mutator functions on its data members, constructor, and functions to manage the on-disk representation of instances of the type.

Specific advantages of structured types as defined in SQL are (a) ease of definition of basic behaviors of the type, and (b) the flexibility to define more complex types. However, a significant disadvantage of structure types is the complexity of definition of type-specific methods, which are usually defined via external functions written in a general-purpose programming language like C or C++. In order to define a structured type fully, the definer of the type needs to straddle a line between SQL and some other programming language.

While the distinct type and structured type features of SQL 99 offer some advantages to users in terms of enabling them to extend the existing scalar type system of a SQL database, there has been a need for improved systems and methods for enabling a user to extend the scalar type system of a database system through user-defined types that act as scalar types but that contain more complex structure and behavior.

The invention disclosed in U.S. patent application Ser. No. 10/775,282, filed on Feb. 10, 2004, entitled "SYSTEM AND METHOD FOR PROVIDING USER DEFINED TYPES IN A DATABASE SYSTEM," (hereinafter, the UDT Patent Application) is directed to a system and method that allows a user to extend the scalar type system of a database system by creating user-defined types that act as scalar types but that contain more complex structure and behavior. According to that invention, a user writes program code in a high-level programming language that implements a class that defines the structure of a user-defined type and methods that can be invoked on instances of the user-defined type. As used therein (and herein), the term "structure," when referring to a user-defined type, encompasses the set of fields or properties that implement the type. The type of each field in the UDT Patent Application could be a scalar SQL type or any previously defined user-defined type. The class defining a user-defined type is then compiled and registered with the database system. Specifically, a CLR class defining a user-defined type may be compiled into an assembly which is then registered with the database system via a CREATE ASSEMBLY data definition statement. After the assembly is registered, a user can register the class within the assembly that defines the user-defined type using a CREATE TYPE data definition statement.

For the invention of the UDT Patent Application, the database system enforces a specific contract that the class must implement to enable the user-defined type to act as a scalar in the SQL type system. The term "contract," as used therein (and herein), refers to a technique that is used at runtime in object-oriented programming environments to check that code to be executed satisfies certain pre-conditions or requirements to ensure that it will execute properly. According to that invention, the contract against which a class that defines a user-defined type is compared comprises several requirements. First, the class must specify one of a plurality of different formats for persisting instances of the user-defined type in a database store. Second, the class must be capable of returning a null value for the user-defined type. Third, the class must provide a method for converting the user-defined type to and from another type, such as a string type. Once these requirements are satisfied, the database system enables instances of the user-defined type to be created. In one embodiment of that application, the user-defined type can be instantiated as a column value in a table, a variable, a parameter of a routine, or a return value of a routine. The database system stores metadata about the class defining the user-defined type for subsequent use in creating instances of the type. In another embodiment of that invention, the verification of the user-defined type contract is performed using the metadata describing the class that defines the type.

The plurality of different formats for persisting instances of the user-defined type comprises a first format in which an instance of the user-defined type is automatically serialized in accordance with a native format of the database system, and a second format in which an instance of the user-defined type is serialized in a manner defined by the user authored class. Additionally, when the invention of the UDT Patent Application is embodied within MICROSOFT SQL SERVER, in which the MICROSOFT .NET CLR is integrated, a third format is available in which an instance of the user-defined type is serialized in accordance with a method provided by the MICROSOFT .NET Framework.

For the invention of UDT Patent Application, expressions in the query language of the database system can include one or more references to an instance(s) of a user-defined type, such that evaluation of the expression requires invocation of a method on the instance of the user-defined type. When the database system receives such a query language expression, it translates the expression into a sequence of program code instructions that, when executed, invoke the required method on the instance of the user-defined type. The database system then returns the result of the method invocation as the result of evaluation of the query language expression. In one embodiment, the instance of the user-defined type is deserialized prior to invoking the method on the instance.

Another feature of the that invention is the ability to change the value of an instance of a user-defined type through invocation of a mutator method. Specifically, the author of the class that defines the user-defined type includes a mutator method as part of the class. When invoked on an instance of the user-defined type, the mutator method enables a value of the user-defined type to be changed. This process may comprise deserializing the instance of the user-defined type, invoking the mutator method to change the value of the deserialized data of the instance, and then serializing the modified instance of the user-defined type to persist the changes.

Another feature of that invention is that the class defining a user-defined type may further contain an attribute that specifies that serialized binary representations of instances of the user-defined type will be binary ordered. This allows binary comparisons to be made on instances of the type and also enables indexing to be performed on instances of the type. Specifically, for instances of a user-defined type that are binary ordered, when a query language expression that requires some comparison of two instances of the type is received by the database system (e.g., >, <, or =), the serialized binary representations of the two instances can be used to evaluate the expression, without deserializing either instance. Additionally, for a user-defined type that is binary ordered, a table in the database store can be created that has a column defined as the user-defined type. An index can then be created on the column. An index can also be created over a query language expression that references the user-defined type. In this case, a computed column is first generated over the expression, and then an index is created over the computed column.

Collections

Data-intensive applications use object data models to capture portions of the real-world (also known as "object data modeling"). Entities (e.g., "Items" in an Item-based hardware/software interface system) and relationships are two common data modeling constructs. For example, if Author and Document are two types of entities, there may be several relationships between Authors and Documents such as "all documents written by an author" and "all documents reviewed by an author," to name a few.

An entity contains a set of properties which may be scalar-valued and/or collection-valued (or set-valued). For example, an Author entity may contain scalar-valued properties for the name and birthday of the author, as well as collection-valued properties for a set of addresses as well as a set of phone numbers for the author. These collection-valued properties, like the scalar-valued properties, are embedded in the entity—that is, they are considered to be part of that entity and not just a defined relationship from the entity to another entity. Each of these collections (a.k.a. "embedded collections") usually contain a small number of members (or "elements"), and in some instances the members of these collections may have a relative order of importance (e.g., when an author has a primary address, a secondary addresses, and so forth). As used herein, an unordered collection is referred to as a "multiset" while an ordered collection is referred to as a "list," the latter being an extension of the former that further account for relative order of the members within the collection.

Extendable Relational Data Store

Although collections have been implemented in existing database products, these products commonly model collections using value-based relationships such as primary key-foreign key concepts and, as such, cannot be treated as relational queriable objects. Moreover, queries to collections—for example, "return all contacts who live in city X"—generally require traversing all of the paths of the collection since said collections are not relational queriable objects.

An extendable relational data store (ERDS) is a relational data store that allows entities to be modeled as user-defined types (UDTs) as set forth in U.S. patent application Ser. No. 10/775,282, filed on Feb. 10, 2004 and entitled "SYSTEM AND METHOD FOR PROVIDING USER DEFINED TYPES IN A DATABASE SYSTEM," which describes the implementation of UDTs. In an ERDS, it would be more natural and convenient to model these collections as part of a user-defined type (UDT) where the collections UDT could be treated as both a scalar and a relation as appropriate. Therefore, what is needed in the art is method for modeling collections as part of a UDT in an ERDS as well as a collection that can be processed as a scalar or queried as a relation.

SUMMARY OF THE INVENTION

Several embodiments of the present invention are directed to systems and methods for extending the UDT framework of an extended relational data store (ERDS) to include support for unordered collections (multisets) and ordered collection (lists). More specifically, several embodiments of the present invention use an UDT infrastructure, CLR generics, and a new UNNEST operator to create and utilize a special type abstraction for collections that is simultaneously a scalar and a relation. As a scalar, this collection type can be processed by all parts of the data store engine that understand scalars (including but not limited to the client stack) and, as a relation, this collection type is queriable like any other type of relation.

Various embodiments of the present invention are directed to an data store comprising a collection type that is both a scalar and a relation. For certain of these embodiments, the method comprises (a) creating a UDT abstraction for a collection type that is inherently registered as a scalar with the scalar typesystem of the data store engine; and (b) as needed, unnesting a collection to query said collection as a relational queriable object.

Several embodiments of the present invention are directed to an enhanced collection for an entity in a relational data store that, for scalar operations applied to said collection, is processed as a scalar and, for query operations applied to said collection, is queried said collection as a relation. For certain of these embodiments, the relational store is a extendable relational data store wherein said collection is both derived from a generic user-defined type in a common language runtime (CLR) and is also a SQL scalar type (in the SQL scalar typesystem). Some of these embodiments require registering both the collection type and a user-defined type corresponding to the collection with the relational data store. In addition, certain embodiments specifically use an unnesting operation on said collection to convert said collection into a relational queriable object comprising a first column wherein each row in said first column corresponds to a single member of said collection (i.e., for multisets). Other embodiments further comprise a second column, each row in said second column corresponds to a single member of said collection, each row having a value corresponding to an order of each said member in said ordered collection (for lists). For select embodiments, both multisets and lists use the same two-column relational queriable object (where the second column might be simply ignored for multisets where order is not important).

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the embodiment described below, the foregoing features of the present invention are described as implemented in the MICROSOFT SQL SERVER database system. As mentioned above, SQL SERVER incorporates the MICROSOFT .NET Common Language Runtime (CLR) to enable managed code to be written and executed to operate on the data store of a SQL SERVER database. While the embodiment described below operates in this context, it is understood that the present invention is by no means limited to implementation in the SQL SERVER product. Rather, the present invention can be implemented in any database system that supports the execution of object-oriented programming code to operate on a database store, such as object oriented database systems and relational database systems with object relational extensions. Accordingly, it is understood that the present invention is not limited to the particular embodiment described below, but is intended to cover all modifications that are within the spirit and scope of the invention as defined by the appended claims.

Computer Environment

Figure 1:
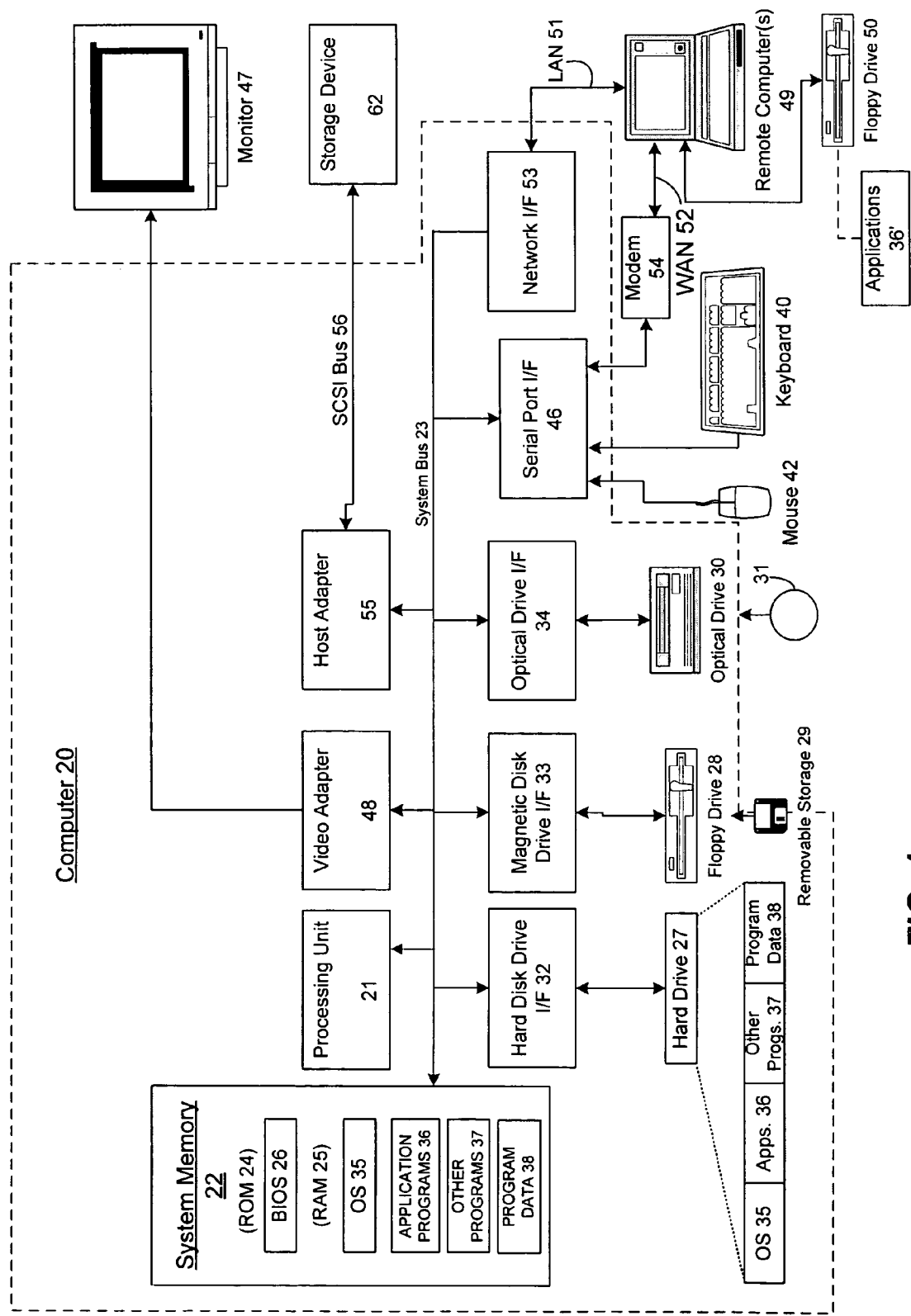
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

UDTs and Managed Code

Figure 2:
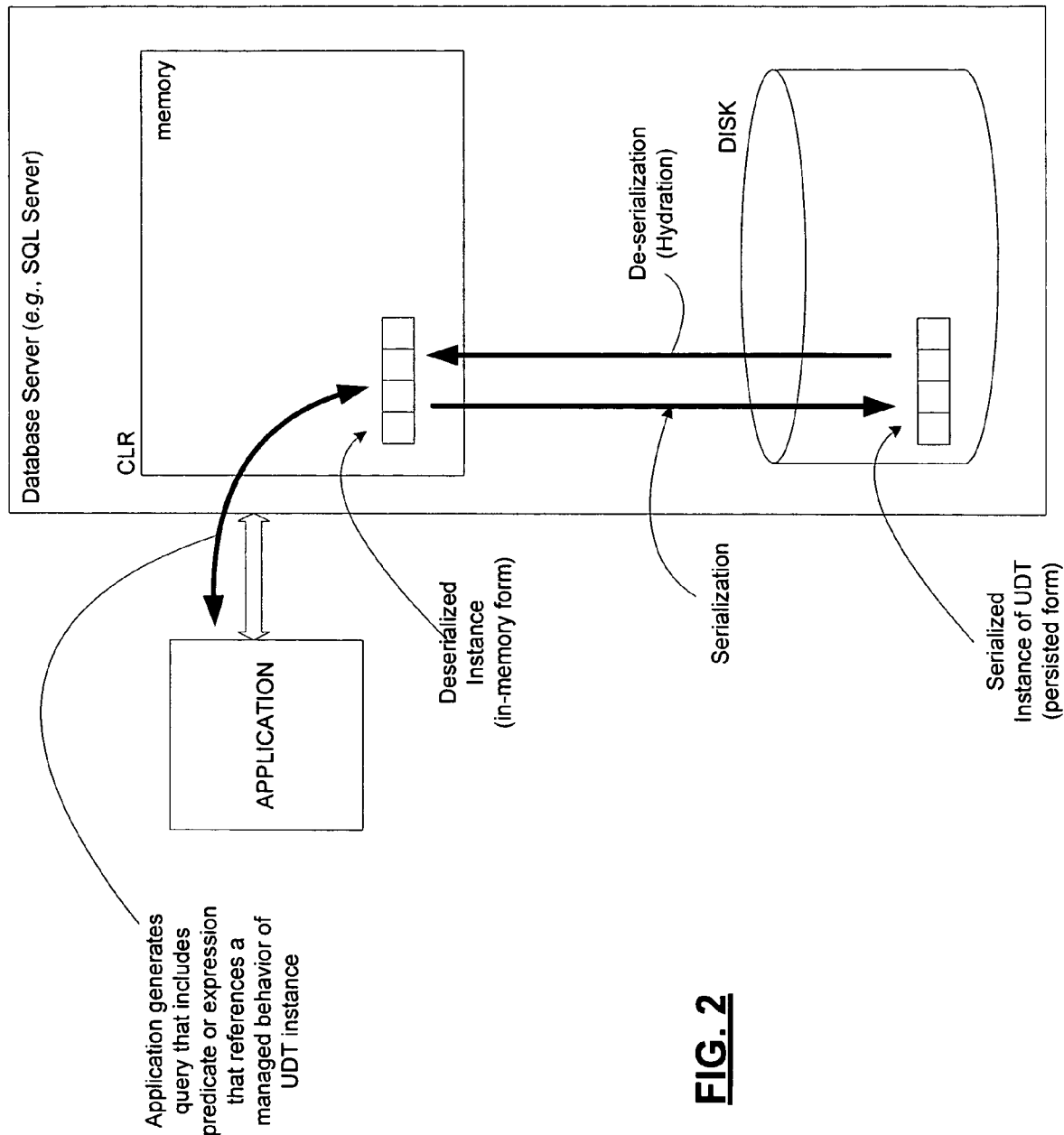
FIG. 2 is a block diagram illustrating the serialization and deserialization of an instance of a user defined type that has been instantiated in managed code.

FIG. 2 is a block diagram illustrating the serialization and deserialization of an instance of a user defined type (UDT). As shown, an instance of a UDT is persisted on disk through serialization of the object representing the instance in memory. When an application generates a query that includes a predicate or expression that references a method of an instance of a UDT, the persisted form of the instance is deserialized (a process also referred to as "hydration") and the CLR allocates memory for the full object in order to receive its stored values. The CLR then invokes the appropriate method on the object that implements the behavior desired by the application or user.

As discussed earlier herein, UDTs are managed types implemented in an assembly registered with SQL SERVER. UDTs can be used in most contexts where a native type can be used, including table definitions variables and parameters. The methods, properties, and fields defined in the UDT that conform to the UDT contract can be invoked from T-SQL. In essence, UDTs are assumed to be simple scalars with behavior. This assumption is reflected in the simple programming model and the serialization layouts supported by UDTs. This structure can be used for a UDT abstraction to create "structured types" which are not simple scalars but could be types with a complex structure and behavior.

Collections—Multisets

Various embodiments of the present invention are directed to a data store abstraction (or type) that is concurrently a scalar and a relation—that is, where as a scalar this type can flow through all parts of the data store engine that understand scalars (including the client stack), and where as a relation this type is queryable. Several of these embodiments use UDT infrastructure, CLR generics, and a new UNNEST operator to together enable such a dualistic type.

Figure 3:
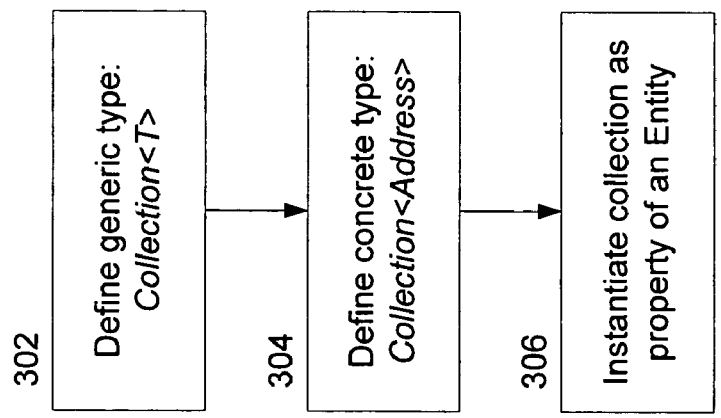
FIG. 3 is a process flow diagram illustration a general method for enabling an extendable relational data store (ERDS) to provide a dualistic (scalar and relation) collection type.

FIG. 3 is a process flow diagram illustration a general method for enabling an extendable relational data store (ERDS) to provide a dualistic collection type. To implement a collection of a such a type, and at step 302, the generics feature of the CLR is used to define a generic type, e.g., Collection<T>. This type is created as a "system UDT" (i.e., a UDT that is defined in one place and is automatically available in all databases) and is a first class part of the SQL scalar typesystem. As such, this type can be used in all the contexts that scalar types are supported such as column definitions, variables, function arguments, and stored procedure parameters. These types are also supported in scalar expression evaluation contexts.

At step 304, the generic type can then be used to create a concrete collection type as a derived type of the generic collection type—that is, a type wherein said members are no longer generic but instead are defined as a scalar type or other complex type. In this example, the concrete type is for a addresses where the individual members are of a scalar string type. In an alternative embodiment, the individual members might instead be a complex type comprising a first string (for street address), a second string (for city), a pair of chars (for state), and a five digit integer (for zip code).

If a collection is declared to contain elements of a particular type, a value of any of the subtypes of that UDT can be stored in that collection (which is called "substitutability"). The relationship between a collection type and its element-type is recorded in metadata at type creation time and is available through queryable catalog views which, in turn, enables applications to compose queries to determine the substitutable extent of a particular collection type.

At step 306, the new concrete collection type can be used as a property in an entity once that entity is itself instantiated. At this point, the order collection is inherently treated as a scalar property unless a query is applied to it, in which case the data store engine recognizes the special features of this collection type and processes the collection as a relation.

To navigate a collection, queries would normally be required to traverse the paths through the collection in order to answer questions such as "return all contacts who live in city X." However, for several embodiments of the present invention, the query engine recognizes that this special collection system type—e.g, "Collection<T>"—having both relation semantics in addition to the scalar semantics associated with UDTs, and that a new relational operator "UNNEST" should be used to transform this scalar into a relational queryable object as needed. This operator is supported in all the contexts that a table-valued function is supported, and view definitions that contain the UNNEST operator are indexable.

Figure 4:
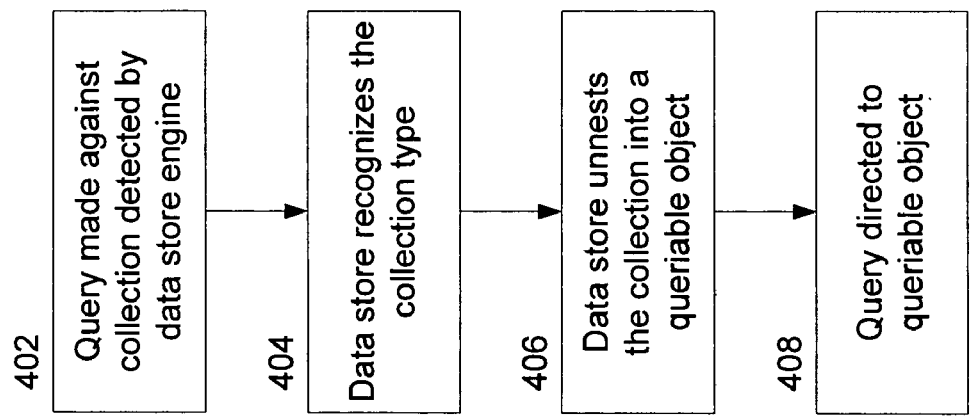
FIG. 4 is a process flow diagram illustrating the general method for processing a query applied to a collection in an entity.

FIG. 4 is a process flow diagram illustrating the general method for processing a query applied to a collection in an entity. At step 402, the query is made against the collection which, if the collection was anything other than a collection would generate a SQL error for the data store engine but, instead, the data store engine, at step 404, recognizes that the collection is a special data type and, at step 406, unnests the collection to create a queriable object—for a mutliset, a single column table in this example—and, at step 408, redirects the query to this queriable object.

Figures 5, 6:
FIG. 5 is a block diagram illustrating an entity that is a structured UDT having a multiset as an embedded field that, when queried, is unnested into a queriable object.
FIG. 6 is a partial block diagram illustrating the queriable object from FIG. 5 that is unnested for a list instead of a multiset.

For example, FIG. 5 is a block diagram illustrating a "Person" entity 500 that is a structured UDT having, among other things, a multiset of addresses as an embedded field 510 that, when queried, is unnested into a queriable object (a single-column table) 410'. The managed type definition for Person is as follows:

```
[SqlUDT(Format.Structured)]
public class Person
{
    ...
    Collection<Address> Addresses;
    ...
}
```

To create this type, an embedded collection type is first registered with the store as follows:
    create type SetOfAddresses from Collection<Address>
    go Next the format.structured UDT is registered as follows:
    create type Person external name [asm]:[Person]
    go Thereafter, to return the set of addresses as a scalar, the following command can be used:
    select pcol.Addresses from t Similarly, to invoke a method on the UDT and the embedded collection the following command can be used:
    select pcol.Name, pcol.Addresses.Count from t To query into the collection, such as seeking all persons with an address in Washington State, the following command can be used:
    select pcol from t cross apply unnest(pcol.Addresses) a where a.State='WA'

And to update a Person, such as changing the state for all of his addresses to Washington State, the following commands can be used:
    update t
        set pcol.(update Addresses set State='WA')
        where pcol.id=23

Likewise, to invoke a mutator method on the collection, the following commands can be used:
    update t
        set pcol.Addresses.Clear( )
        where pcol.id=23

For specific embodiments of the present invention, the implementation framework uses system UDTs, CLR generics, and an UNNEST operation that employs a streaming table-valued function infrastructure.

System UDTs are system types that are implemented using the user-defined-type (UDT) infrastructure. System UDTs differ from end-user-authored UDTs in the following ways: (a) system UDTs are available in all databases and accessible to all users; (b) system UDTs cannot be created or dropped by end users; (c) system UDTs can be used across databases as if there was a single such type in the system (i.e., an instance of a system type in one database will be usable from another database) ("type identity"); (d) system UDTs can be implemented in a "system" assembly (like System.Data.dll), and this system assembly can be part of the base CLR infrastructure that is loaded from someplace other than the database (e.g., a disk); and (e) system UDTs are part of the SYS schema and so it will not be possible for a user to create their own UDTs with the same name as a system UDT.

Generics are parameterized type definitions which can be used for a collection class library (such as MultiSet<T>) which make it possible to globally define the "generic multiset" once and, thereafter, have a type-safe implementation for each "concrete instantiation" (such as MultiSet<Address> or MultiSet<PhoneNumber>)—in other words, MultiSet<T> is a generic system UDT that is defined once, for example, in the UDTextensions.dll.

The UNNEST operator takes a UDT of type MultiSet<T> (or whose SQL type is a another concrete multiset type) and transforms it into a single-column table, each row of said column corresponding to a member of said collection, to thus enable on-the-fly queries and navigation of the members of said collection. For certain embodiments of the present invention, during the binding process a special namespace is created for the column produced by the UNNEST operation, and the UNNEST operation itself becomes a streaming table valued function. This optimization allows the transformation of the collection from scalar to relation to happen without the necessity of intervening copies of the data. This approach also provides a streaming model over the results such that they can be consumed without redundant materialization. (Streaming table valued functions are described: U.S. patent application Ser. No. 10/821,687, filed on Apr. 9, 2004, entitled "SYSTEMS AND METHODS FOR FRAGMENT-BASED SERIALIZATION."

Collections—Lists

A list is a collection that has been extended to capture the order of the collection's members. Similar to multisets, values of this type can be used in all contexts where scalar UDT values are allowed, including variables, parameters, return values and column definitions. A list also works with an UNNEST function that transforms the inherently scalar collection value into a relation; however, the relational schema produced by UNNEST will have at least two columns, one containing the members (one member per row), and the other column (or pseudo-column or virtual column) comprising a value indicating relative order of said member in said list, e.g., an ordinal of a given element. FIG. 6 is a partial block diagram illustrating the queriable object 510" from FIG. 5 that is created when a query is directed to a list instead of to a multiset. Also, as with multisets, the TSQL DML will be extended to support array access operations on values of type List.

To the rest of the orthogonality matrix contract for this type (including the conversion matrix and use in cross database contexts) is assumed to be same as for Format.Structured UDTs (as used herein below). In addition, a "list" may also be referred to as an "array" as the latter term is used in the SQL99 standard.

The following example illustrates a alternative UDT Person class containing two list-valued properties for addresses and phone numbers:

```
[SqlUdt(Format.Structured)]
class Person {
    String Name;
    DateTime Birthdate;
    SqlList<Address> Addresses;
    SqlList<Phone> Phones;
}
```

The types SqlList<Address> and SqlList<Phone> above are defined to SQL Server using new data definition language (DDL) statements:
   create type ListOfAddress from LIST<Address>
   create type ListOfPhone from LIST<Phone>

The following statement then creates a table with a column of table Person:
   create table Persons (pcol Person)

Once this is completed, the following statement can be used to create a Person instance with two addresses and three phones as follows:
   declare @p Person, @a1 Address, @a2 Address
   declare @p1 Phone, @p2 Phone, @p3 Phone
   set @p=convert (Person, "John Smith, 11/11/1977")
   set @a1=convert(Address, "6138 205th DR NE, Redmond, Wash., 98053")
   set @a2=convert(Address, "15765 99th Ave NE, Seattle, Wash. 98001")
   set @p1=convert(Phone, "Office, 206 686 3452")
   set @p2=convert(Phone, "Home, 425 708 6456")
   set @p3=convert(Phone, "Cell, 425 277 3242")
   set @p.Addresses[1]=@a1
   set @p.Addresses[2]=@a2
   set @p.Phones[1]=@p2
   set @p.Phones[2]=@p1
   set @p.Phones[3]=@p3
   insert into Persons values (@p)

Thereafter, one can query all secondary addresses and cell phones of people within the Persons table whose primary address is in Seattle as follows:
   select pcol.name, pcol.addresses[2], pcol.Phones[3] from Persons
   where pcol.addresses[1].city="Seattle"

Once again, UNNEST is the construct that takes a list as an argument and produces a set of rows, one for each element of the list. UNNEST produces two columns, one for the member elements and one for the relative order of each member in the list (e.g., ordinal values of the corresponding elements priority).

Conclusion

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A relational data store method, said method comprising:
receiving an operation to be applied to a collection in an extendable relational data store, the collection is derived from a generic user-defined type (UDT) in a common language runtime (CLR) and is a structured query language (SQL) scalar type, the collection being processable as a scalar and the same collection being queriable as a relation, wherein the operation is a scalar operation or a query operation;
for scalar operations applied to said collection, processing said collection as a scalar;
for query operations applied to said collection, querying said collection as a relation,
wherein querying said collection as a relation comprises:
recognizing said collection as a queriable relation;
unnesting said collection to create a queriable object; and
performing said query operations on said queriable object; and
storing the results of the processing or querying.

2. The method of claim 1 wherein said generic user-defined type is a system user-defined type.

3. The method of claim 2 further comprising:
   registering said collection type with said relational data store; and
   registering a user-defined type corresponding to said collection with said relational data store.

4. The method of claim 3 wherein said element of querying said collection as a relation comprises:
   unnesting said collection into a relational queriable object comprising a first column wherein each row in said first column corresponds to a single member of said collection; and
   querying said relational queriable object.

5. The method of claim 4 wherein said relational queriable object comprises a second column, each row in said second column corresponds to a single member of said collection, each row having a value corresponding to an order of each said member in said ordered collection.

6. The method of claim 2 implemented by a hardware control device, said hardware control device comprising means for implementing each element of said method.

7. A computer-readable storage medium comprising computer-readable instructions for implementing a relational data store method, said computer-readable instructions comprising instructions for:
   receiving an operation to be applied to a collection in an extendable relational data store, the collection derived from a generic user-defined type (UDT) in a common language runtime (CLR) and is a structured query language (SQL) scalar type, the collection being processable as a scalar and the same collection being queriable as a relation, wherein the operation is a scalar operation or a query operation;
   processing said collection as a scalar when the scalar operation is applied to said collection;
   querying said collection as a relation when the query operation is applied to said collection, wherein querying said collection as a relation comprises:
      recognizing said collection as a queriable relation;
      unnesting said collection to create a queriable object; and
      performing said query operation on said queriable object; and
   storing the results of the processing or querying.

8. The computer-readable storage medium of claim 7 further comprising instructions whereby said generic user-defined type is a system user-defined type.

9. The computer-readable storage medium of claim 8 further comprising instructions for:
   registering said collection type with said relational data store; and
   registering a user-defined type corresponding to said collection with said relational data store.

10. The computer-readable storage medium of claim 9 further comprising instructions whereby said element of querying said collection as a relation comprises:
    unnesting said collection into a relational queriable object comprising a first column wherein each row in said first column corresponds to a single member of said collection; and
    querying said relational queriable object.

11. The computer-readable storage medium of claim 10 further comprising instructions whereby said relational queriable object comprises a second column, each row in said second column corresponds to a single member of said collection, each row having a value corresponding to an order of each said member in said ordered collection.

12. A system for implementing an extendable relational data store, said system comprising a processor and a storage for:
    receiving an operation to be applied to a collection in the extendable relational data store, the collection derived from a generic user-defined type (UDT) in a common language runtime (CLR) and is a structured query language (SQL) scalar type, the collection being processable as a scalar and the same collection being queriable as a relation, wherein the operation is a scalar operation or a query operation;
    processing said collection as a scalar when the scalar operation is applied to said collection
    queying said collection as a relation when the query operation is applied to said collection, wherein querying said collection as a relation comprises:
    recognizing said collection as a queriable relation;
    unnesting said collection to create a queriable object; and
    performing said query operation on said queriable object; and
    storing the results of the processing or queuing.

13. The system of claim 12 further comprising at least one subsystem whereby said generic user-defined type is a system user-defined type.

14. The system of claim 13 further comprising at least one subsystem for:
    registering said collection type with said relational data store; and
    registering a user-defined type corresponding to said collection with said relational data store.

15. The system of claim 14 further comprising at least one subsystem for:
    unnesting said collection into a relational queriable object comprising a first column wherein each row in said first column corresponds to a single member of said collection; and
    querying said relational queriable object.

16. The system of claim 15 further comprising at least one subsystem whereby said relational queriable object comprises a second column, each row in said second column corresponds to a single member of said collection, each row having a value corresponding to an order of each said member in said ordered collection.

* * * * *